(12) United States Patent
Miyake

(10) Patent No.: US 12,200,573 B2
(45) Date of Patent: Jan. 14, 2025

(54) LOCATION ESTIMATION APPARATUS, LOCATION ESTIMATION METHOD, AND NON-TRANSITORY COMPUTER READABLE MEDIUM STORING PROGRAM FOR LOCATION ESTIMATION

(71) Applicant: JVCKENWOOD Corporation, Yokohama (JP)

(72) Inventor: Fumiaki Miyake, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 406 days.

(21) Appl. No.: 17/727,544

(22) Filed: Apr. 22, 2022

(65) Prior Publication Data

US 2022/0248183 A1 Aug. 4, 2022

Related U.S. Application Data

(63) Continuation of application No. PCT/JP2020/042757, filed on Nov. 17, 2020.

(30) Foreign Application Priority Data

Nov. 25, 2019 (JP) .................................. 2019-212123

(51) Int. Cl.
*H04W 4/029* (2018.01)
*G01S 5/06* (2006.01)

(52) U.S. Cl.
CPC ............... *H04W 4/029* (2018.02); *G01S 5/06* (2013.01)

(58) Field of Classification Search
CPC ... H04W 4/029; H04W 4/02; G01S 5/06; G01S 5/0205; G01S 5/02213; G01S 5/145
USPC ....................................... 455/456.1
See application file for complete search history.

(56) References Cited

U.S. PATENT DOCUMENTS

| 10,869,240 | B2 * | 12/2020 | Liu ........................ H04W 36/22 |
| 2016/0205504 | A1 * | 7/2016 | Chen ..................... H04W 64/00 |
| | | | 455/456.1 |
| 2016/0267779 | A1 * | 9/2016 | Kuang ................... G08C 17/02 |
| 2021/0337454 | A1 * | 10/2021 | Zhao ............... H04W 36/00837 |

FOREIGN PATENT DOCUMENTS

| JP | 2006071516 A | 3/2006 |
| JP | 2016048205 A | 4/2016 |

* cited by examiner

*Primary Examiner* — Tanmay K Shah
(74) *Attorney, Agent, or Firm* — Procopio, Cory, Hargreaves & Savitch LLP

(57) ABSTRACT

A location information server including: an acquisition unit configured to acquire, from each of a plurality of receivers, a received signal strength of a radio signal transmitted from a transmitter; an estimation unit configured to estimate a location of the transmitter based on the received signal strengths of the first to the third highest among the acquired received signal strengths; and a correction unit configured to correct, when the difference between a received signal strength based on at least one of the received signal strengths of the first to the third highest and a received signal strength of the fourth highest is smaller than a predetermined value, the estimated location of the transmitter based on the received signal strength of the fourth highest.

10 Claims, 19 Drawing Sheets

| DIFFERENCE IN RSSI [dBm] | 0 | -0.1 | ~ | -1.4 | -1.5 |
|---|---|---|---|---|---|
| LOCATION | X | P14 | ~ | P1 | A1 |

Fig. 9

LOCATION ESTIMATION APPARATUS, LOCATION ESTIMATION METHOD, AND NON-TRANSITORY COMPUTER READABLE MEDIUM STORING PROGRAM FOR LOCATION ESTIMATION

CROSS REFERENCE TO RELATED APPLICATION

This application is based upon and claims the benefit of priority from Japanese patent application No. 2019-212123 filed on Nov. 25, 2019, the disclosure of which is incorporated herein in its entirety by reference.

BACKGROUND

The present disclosure relates to a location estimation apparatus, a location estimation method, and a program for location estimation.

In recent years, the range of utilization of location estimation systems for estimating locations of electronic devices has been widening. Examples of location estimation systems include, in addition to a system for calculating outdoor location information using the GPS (Global Positioning System) satellite, a system in which Bluetooth (registered trademark) and LAN (Local Area Network) signals are used to obtain the indoor location information.

In these systems, a three-point positioning method of estimating a location based on the RSSI (Received Signal Strength Indicator) is used. As related techniques, for instance, Japanese Unexamined Patent Application Publication No. 2006-71516 and Japanese Unexamined Patent Application Publication No. 2016-48205 are known. In the related techniques such as Japanese Unexamined Patent Application Publication No. 2006-71516 and Japanese Unexamined Patent Application Publication No. 2016-48205, under an environment in which a plurality of receivers are installed, a transmission signal sent out from a transmitter is received by the plurality of receivers, and the location of the transmitter is estimated from the signal strength of the reception signal received by each of the plurality of receivers.

SUMMARY

In the aforementioned related techniques, the location of the transmitter is estimated by the three-point positioning method based on the signal strength of the signal received by each receiver installed in three locations. However, in the related technique, since an error occurs in the calculation of the location of the transmitter due to the environment and the like between the transmitter and the receivers, there is a problem that it is difficult to accurately estimate the location of the transmitter.

An embodiment provides a location estimation apparatus including:
an acquisition unit configured to acquire, from each of a plurality of receivers, a received signal strength of a radio signal sent out from a transmitter;
an estimation unit configured to estimate a location of the transmitter based on the received signal strengths of the first to the third highest among the acquired received signal strengths; and
a correction unit configured to correct, when the difference between a received signal strength based on the received signal strength of at least one of the first to the third highest and a received signal strength of the fourth highest is smaller than a predetermined value, the estimated location of the transmitter based on the received signal strength of the fourth highest.

An embodiment provides a location estimation method including:
acquiring, from each of a plurality of receivers, a received signal strength of a radio signal sent out from a transmitter;
estimating a location of the transmitter based on the received signal strengths of the first to the third highest among the acquired received signal strengths; and
correcting, when the difference between a received signal strength based on at least one of the received signal strengths of the first to the third highest and a received signal strength of the fourth highest is smaller than a predetermined value, the estimated location of the transmitter based on the received signal strength of the fourth highest.

An embodiment provides a program for location estimation for causing a computer to execute processing of:
acquiring, from each of a plurality of receivers, a received signal strength of a radio signal sent out from a transmitter;
estimating a location of the transmitter based on the received signal strengths of the first to the third highest among the acquired received signal strengths; and
correcting, when the difference between a received signal strength of at least one of the first to the third highest and a received signal strength of the fourth highest is smaller than a predetermined value, the estimated location of the transmitter based on the received signal strength of the fourth highest.

BRIEF DESCRIPTION OF THE DRAWINGS

FIG. 9 is a diagram for describing the location correction method according to the first embodiment;

DETAILED DESCRIPTION

Hereinbelow, embodiments will be described with reference to the drawings. In the figures, the identical reference symbols denote identical structural elements and the redundant explanation thereof is omitted where appropriate.

First Embodiment

Figure 1:
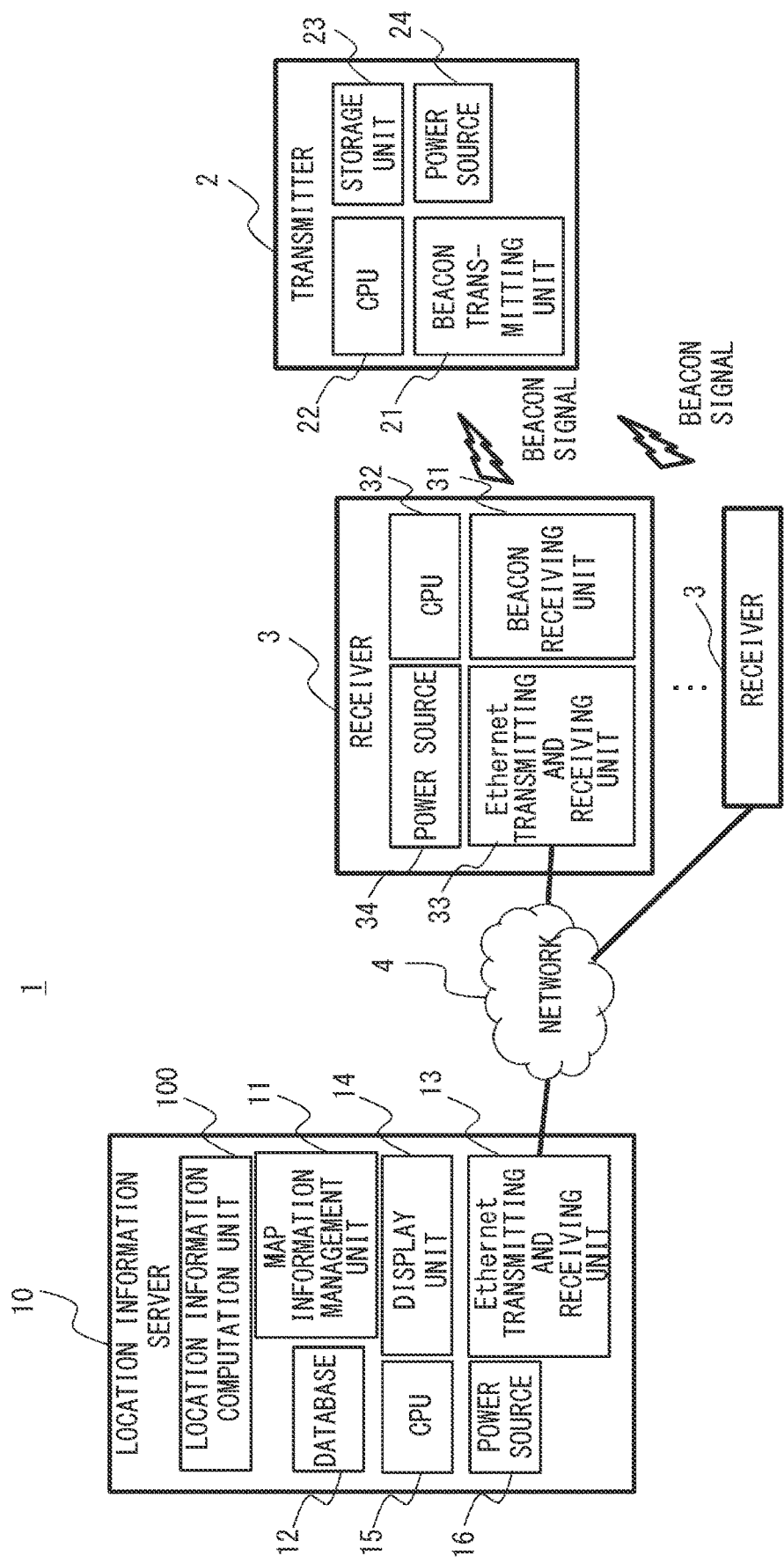
FIG. 1 is a configuration diagram showing a configuration example of a location estimation system according to a first embodiment.
Figure 2:
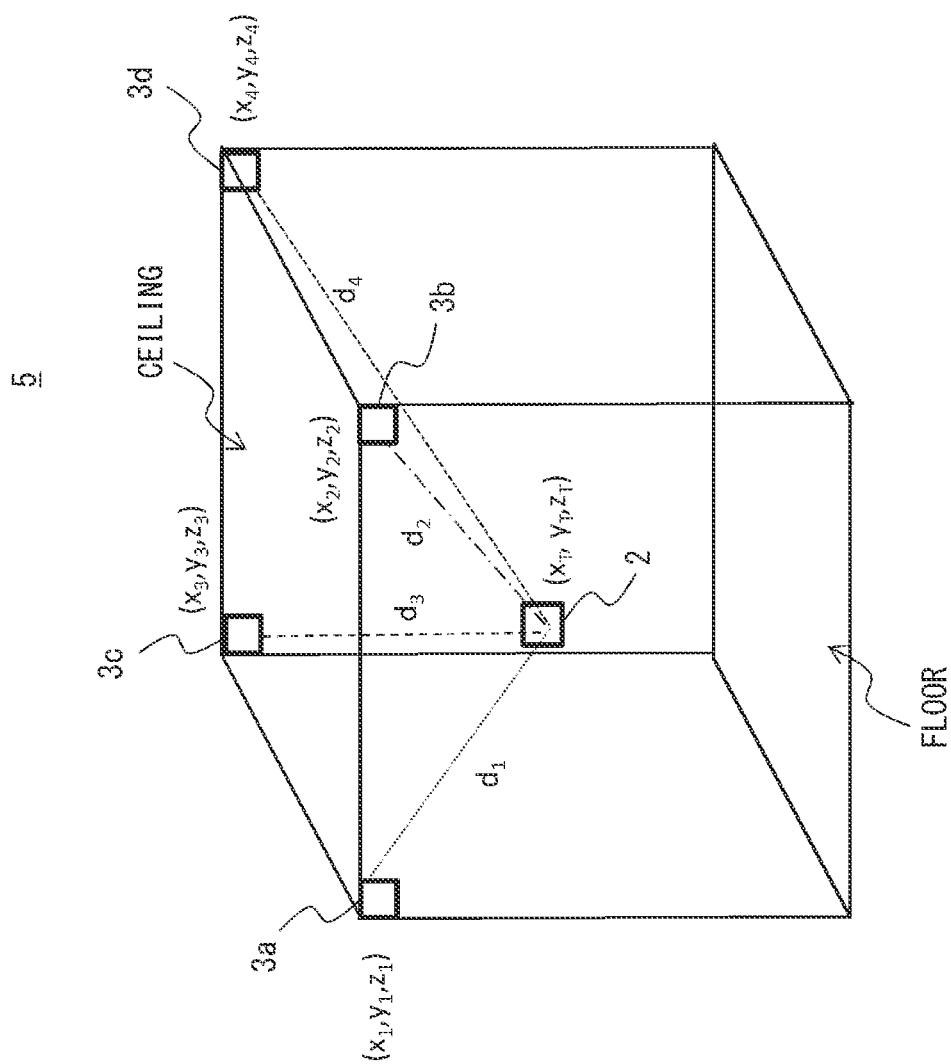
FIG. 2 is a perspective diagram of a room illustrating an installation example of receivers according to the first embodiment.
Figure 3:
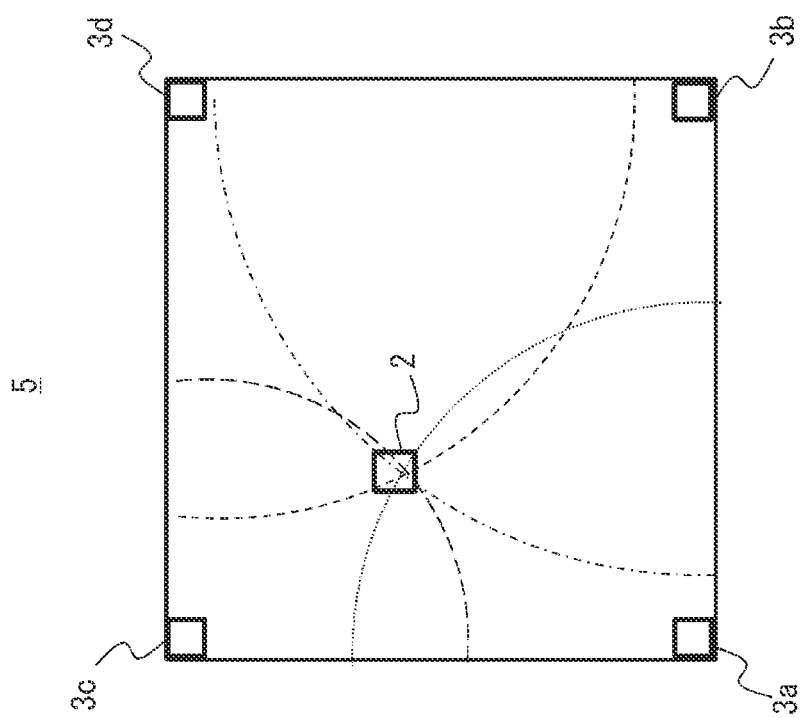
FIG. 3 is a plane diagram of the room illustrating the installation example of the receivers according to the first embodiment.

A first embodiment will be described. FIG. 1 is a configuration diagram showing a configuration example of a location estimation system according to this embodiment. FIG. 2 is a perspective diagram of a room illustrating an installation example of receivers. FIG. 3 is a plane diagram of the installation example of the receivers shown in FIG. 2 viewed from the ceiling side of the room.

As shown in FIG. 1, a location estimation system 1 according to this embodiment includes a transmitter 2, a plurality of receivers 3, and a location information server 10. The location estimation system 1 performs measurement of the location of the transmitter 2 using a beacon signal transmitted from the transmitter 2. The beacon signal is, for example, iBeacon (registered trademark) of Bluetooth Low Energy (BLE). Note that the beacon signal is not limited to Bluetooth, and may be other radio signals such as wireless LAN.

In the examples shown in FIGS. 2 and 3, the four receivers 3a to 3d are installed near the corners of the ceiling of a room 5. It can be said that the receivers 3a to 3d are installed at vertices of a quadrangle in a plane view. The quadrangle composed of the receivers 3a to 3d may be a rectangle including a square or may be any other quadrangles. The three-dimensional space within the room 5 surrounded by the receivers 3a to 3d is the location measurement region. The receivers 3a to 3d measure the signal strength of the beacon signal received from the transmitter 2 and based on the measured signal strength of the beacon signal, the location of the transmitter 2 in the location measurement region in the room 5 is estimated by the three-point positioning method. In this example, the four receivers 3a to 3d are shown, however, five or more receivers 3 may be disposed so as to surround the location measurement region.

Note that the plurality of the receivers 3 may be disposed at any place such as on the floor or on the wall of a room. In order to avoid the beacon signal from the transmitter 2 from being blocked by any obstacles, it is desirable to install the receivers 3 at a high place such as a ceiling. Further, in this example, the receivers 3 are installed indoors, however it is not limited thereto, and the receivers 3 may be installed outdoors and the location of the transmitter 2 may be estimated outdoors.

The transmitter 2 is a transmitter that sends out a beacon signal for performing location measurement and is a device that is a target of location measurement. The transmitter 2 includes a beacon transmitting unit 21, a CPU (Central Processing Unit) 22, a storage unit 23, and a power source 24. The beacon transmitting unit 21 transmits a beacon signal in accordance with a communication protocol such as the BLE. The beacon transmitting unit 21 performs periodic broadcasting of the beacon signal including the ID information for distinguishing the transmitter 2 to the surrounding area.

The CPU 22 is a control unit configured to control each unit of the transmitter 2. The CPU 22 controls the transmission timing of the beacon signal, the transmission power, and the like. The storage unit 23 is a storage unit configured to store information necessary for the operation of the transmitter 2. The storage unit 23 stores the ID information and the like of the transmitter 2 included in the beacon signal. The power source 24 is a battery power source or the like for the transmitter 2 to operate. The power source 24 may be built into the transmitter 2 or may be supplied from an external source.

In addition to the above, the transmitter 2 may further include, as needed, a geomagnetic sensor for detecting the orientation of the transmitter 2, a GPS receiving unit configured to receive a GPS signal, a display unit configured to display information to a user, a key processing unit for performing encryption/decryption, and the like.

The receivers 3 receive a beacon signal from the transmitter 2. Each receiver 3 is a device configured to measure and output the received signal strength of the beacon signal it has received. Each receiver 3 includes a beacon receiving unit 31, a CPU 32, an Ethernet (registered trademark) transmitting and receiving unit 33, and a power source 34. The beacon receiving unit 31 receives the beacon signal transmitted by wireless transmission from the transmitter 2 in accordance with the communication protocol such as the BLE and further, performs measurement of the signal strength of the beacon signal it has received.

The CPU 32 is a control unit configured to control each unit of the receiver 3. The CPU 32 generates signal strength measurement information to be transmitted to the location information server 10 based on the ID information included in the beacon signal received from the transmitter 2 and the received signal strength of the beacon signal. The Ethernet transmitting and receiving unit 33 performs communication with the location information server 10 via the network 4 in accordance with the Ethernet standards. The Ethernet transmitting and receiving unit 33 transmits the signal strength measurement information including the ID information and the received signal strength of the beacon signal it has received to the location information server 10. The power source 34 is a power source for operating each receiver 3. The power source 34 may be built into each receiver 3 or may be supplied from an external source.

The location information server 10 is a location estimation apparatus that estimates the location of the transmitter 2 based on the received signal strength of the plurality of the beacon signals. The location information server 10 includes a location information computation unit 100, a map information management unit 11, a database 12, an Ethernet transmitting and receiving unit 13, a display unit 14, a CPU 15, and a power source 16.

The location information computation unit 100 performs computation of the location information of the transmitter 2 based on the received signal strength of the beacon signal measured by the plurality of the receivers 3. The location information computation unit 100 receives the signal strength measurement information including the ID information of the beacon signal of the transmitter 2 and the received signal strength from each of the plurality of the receivers 3 and estimates the three-dimensional location of the transmitter 2 identified from the ID information by referring to the distances (e.g. distances $d_1$, $d_2$, $d_3$) between the receivers 3 and the transmitter 2 as shown in FIGS. 2 and 3 that are calculated based on the three-dimensional positional relationship of the receivers 3 on the map and the received signal strength. In this embodiment, the location information computation unit 100 estimates the location of the transmitter 2 based on the received signal strength at the first to the third receivers 3 among the plurality of the receivers 3, and further corrects the estimated location based on the received signal strength at the fourth receiver 3.

The map information management unit 11 manages the map information of the database 12. The database 12 stores information necessary for the processing performed by the location information server 10. The database 12 stores the map information, the location of the receivers 3 on the map, the calculated location information of the transmitter 2, and the like. The Ethernet transmitting and receiving unit 13 performs communication with the plurality of the receivers 3 via the network 4 in accordance with the Ethernet standards. The Ethernet transmitting and receiving unit 13 receives, from the plurality of the receivers 3, the signal strength measurement information including the ID information and the received signal strength of the beacon signal received by each of the plurality of the receivers 3.

The display unit 14 is a display unit configured to display information to the user. The display unit 14 displays the location information of the transmitter 2 in a superimposed manner on the map information. The CPU 15 is a control unit configured to perform control of each unit of the location information server 10. For instance, the CPU 15 performs control to cause the display unit 14 to display the location information of the transmitter 2 computed by the location information computation unit 100. The power source 16 is a power source for operating the location information server 10. In addition, the location information server 10 may further include, as needed, a key processing unit for performing encoding/decoding, and the like.

Figure 4:
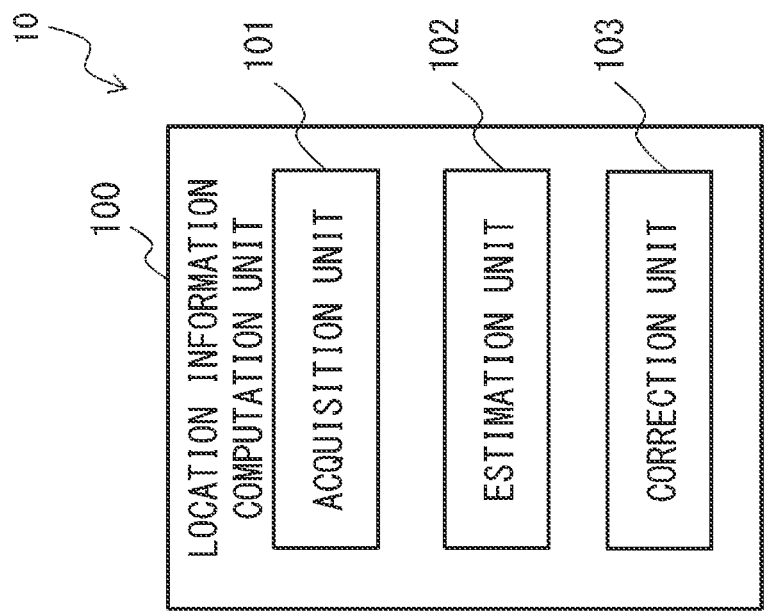
FIG. 4 is a configuration diagram showing a configuration example of a location information computation unit in a location information server according to the first embodiment.

FIG. 4 shows a configuration example of a location information computation unit 100 in the location information server 10. As shown in FIG. 4, the location information computation unit 100 includes an acquisition unit 101, an estimation unit 102, and a correction unit 103.

The acquisition unit 101 acquires the signal strength measurement information from the plurality of the receivers 3 via the Ethernet transmitting and receiving unit 13. The estimation unit 102 estimates the location of the transmitter 2 based on the signal strength measurement information acquired by the acquisition unit 101. Since the location of the transmitter 2 is estimated by the three-point positioning method, the estimation unit 102 calculates the location of the transmitter 2 using the signal strength measurement information of three of the plurality of the receivers 3 from among the signal strength measurement information acquired from the plurality of the receivers 3. Since the higher the received signal strength, the more stable and accurate value is likely to be obtained, for example, the signal strength measurement information of the receivers 3 at which the received signal strengths are the first to the third highest (the first to the third highest receivers 3) are used.

The correction unit 103 corrects the estimated location of the transmitter 2 estimated by the estimation unit 102 using the three-point positioning method based on the signal strength measurement information of the receivers 3 which are not used in the computation of the estimation. In this example, since the signal strength measurement information of the receivers 3 at which the received signal strengths are the first to the third highest are used in performing location estimation, for instance, the receiver 3 at which the received signal strength is the fourth highest (the fourth highest receiver) is used in performing correction of the estimated location. In order to improve the accuracy of estimation of the location, when the received signal strength of the fourth highest is of the same level as the received signal strengths of the first to the third highest, it is desirable to correct the estimated location using the signal strength measurement information of the receiver 3 at which the received signal strength is the fourth highest. That is, when the difference between the received signal strength of the fourth highest and each of the received signal strengths of the first to the third highest is smaller than the predetermined value, the estimated location is corrected using the signal strength measurement information of the receiver 3 at which the received signal strength is the fourth highest. Note that when there are five or more receivers 3, the signal strength measurement information of the receiver 3 to be referred to is not limited to the receiver at which the received signal strength is the fourth highest, and the signal strength measurement information of the receiver 3 at which the received signal strength that differs from the received signal strengths of the first to the third highest by a value smaller than the predetermined value may be referred to.

Figure 5:
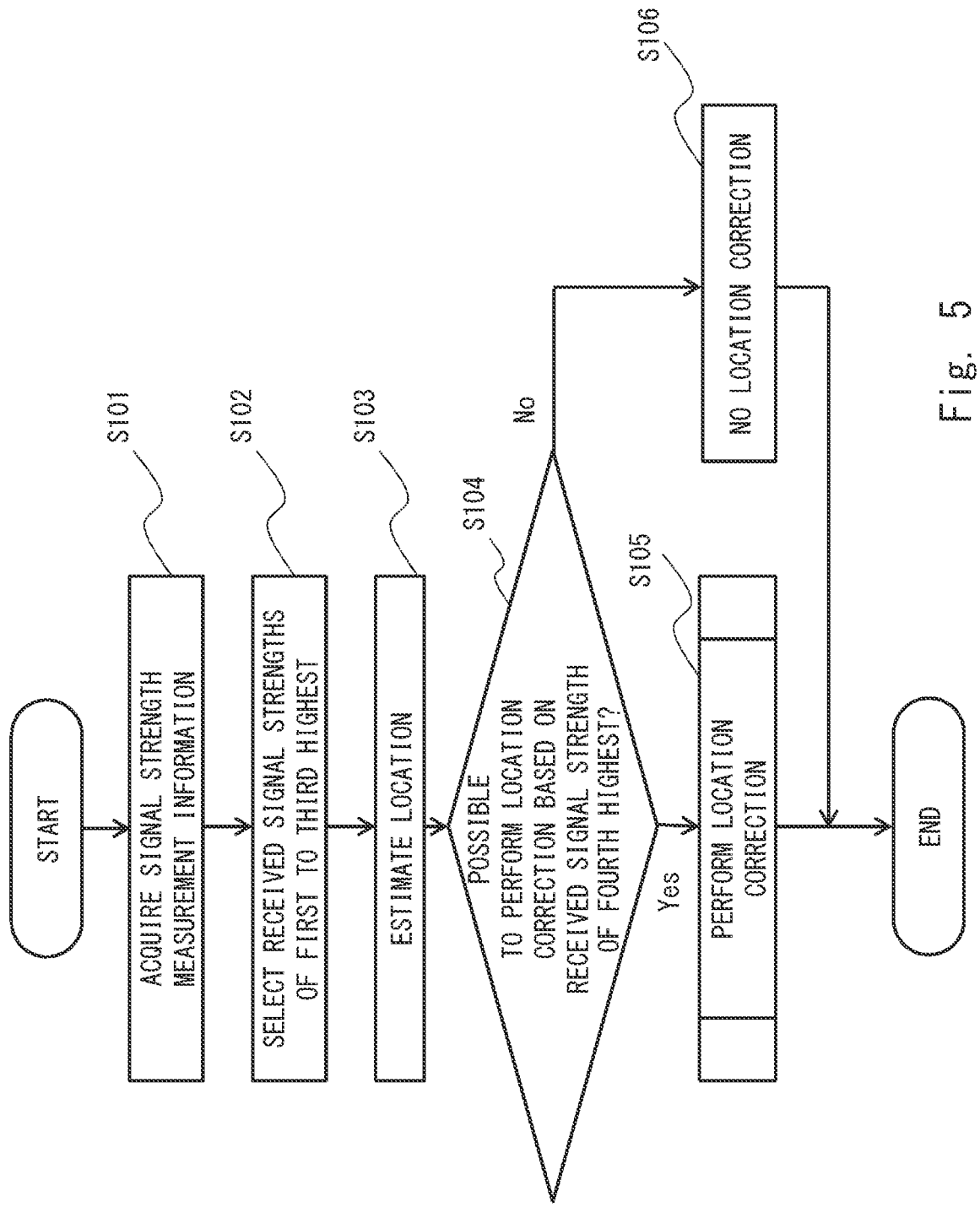
FIG. 5 is a flowchart showing an example of a location estimation method according to the first embodiment.
Figure 6:
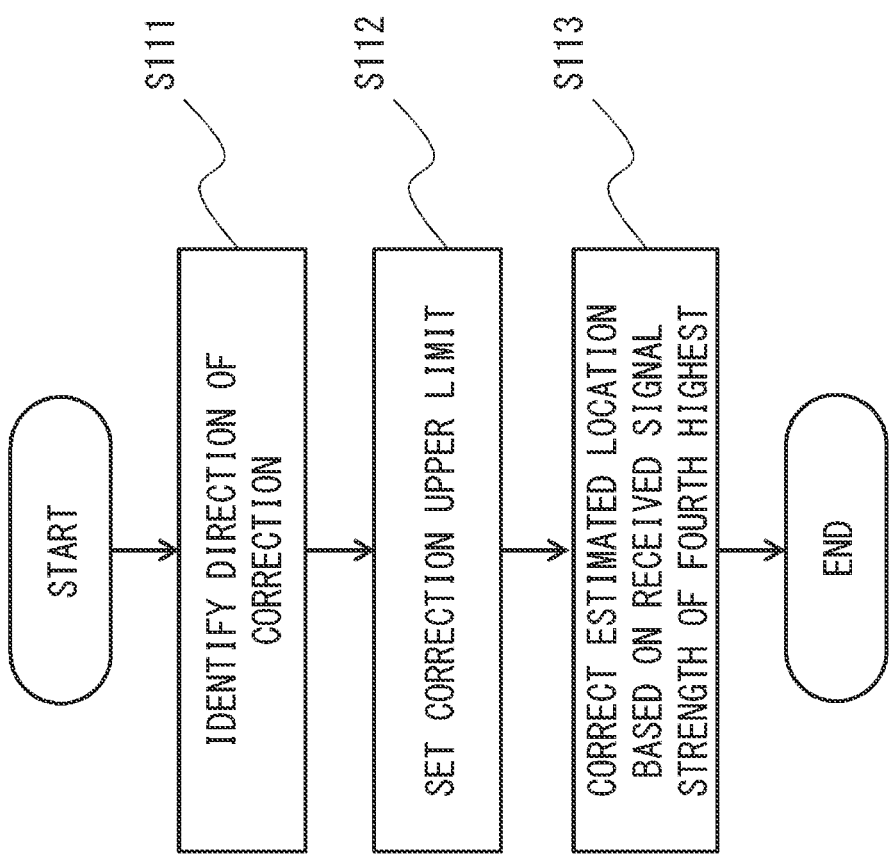
FIG. 6 is a flowchart showing an example of a location correction method according to the first embodiment.

Next, the location estimation method according to this embodiment will be described. FIG. 5 shows a flow of a location estimation method implemented in the location information server 10 according to this embodiment. FIG. 6 shows a flow of location correction processing (S105) shown in FIG. 5.

As shown in FIG. 5, first, the location information server 10 acquires the signal strength measurement information from the plurality of the receivers 3 (S101). That is, when the transmitter 2 sends out a beacon signal, the plurality of the receivers 3 present in the periphery of the transmitter 2 receive the beacon signal and measures the received signal strength of the beacon signal. Further, the acquisition unit 101 of the location information computation unit 100 in the location information server 10 acquires, from the plurality of the receivers 3, the signal strength measurement information including the ID information of the beacon signal and the received signal strength.

Next, the location information server 10 selects the signal strength measurement information of the receivers at which the received signal strengths are the first to the third highest (S102). The estimation unit 102 of the location information computation unit 100 compares the received signal strengths included in the acquired signal strength measurement information of the plurality of the receivers 3 and selects the signal strength measurement information of the receivers at which the received signal strengths are the first to the third highest among the plurality of the received signal strengths as the received signal strength to be used in performing location estimation by the three-point positioning method.

Next, the location information server 10 estimates the location of the transmitter 2 based on the selected signal strength measurement information (S103). The estimation unit 102 of the location information computation unit 100 calculates the location of the transmitter 2 by the three-point positioning method using the selected signal strength measurement information of the receivers at which the received signal strengths are the first to the third highest.

The three-point positioning method is a method of calculating the distance between the transmitter and the receiver based on the received signal strength and estimating the location of the transmitter based on the calculated distance information and the location information of the receiver that has received the signal. In the calculation of this distance, since the received signal strength attenuates in inverse proportion to square of the distance, the received signal strength measured in a state in which the receiver and the transmitter are installed distant from each other by a reference distance is used as a reference value.

For instance, some information are incorporated within the iBeacon signal, which is one of the beacon signals, and a parameter called Measured Power is included in those information to be incorporated. In the case of iBeacon, the received signal strength measured with the transmitter and the receiver being distant from each other by 1 m is defined as Measured Power, and this received signal strength serving as a reference is referred to as "RSSI@1 m". Then, from the received signal strength serving as a reference and the received signal strength (RSSI) that has been actually measured, the distance (d) between the transmitter and the receiver can be calculated by the following expression.

$$d=10^{\{(RSSI@1\ m-RSSI)/(10*n)\}} \tag{1}$$

In this expression (1), n represents the propagation loss coefficient. n takes the value 2 under an ideal circumstance, and varies depending on the reception environment of the radio waves.

For example, calculation of the location of the transmitter 2 from the signal strength measurement information of the receivers 3a to 3c shown in FIG. 2 will be described. At this time, the positional relationship between the receivers 3 and the transmitter 2 are expressed by the three-dimensional orthogonal coordinate system (X-axis, Y-axis, Z-axis), and the location of the receiver 3a is represented by $(x_1, y_1, z_1)$, the location of the receiver 3b is represented by $(x_2, y_2, z_2)$, the location of the receiver 3c is represented by $(x_3, y_3, z_3)$, the location of the transmitter 2 is represented by $(x_T, y_T, z_T)$. Further, the distance between the receiver 3a and the transmitter 2 is represented by $d_1$, the distance between the receiver 3b and the transmitter 2 is represented by $d_2$, and the distance between the receiver 3c and the transmitter 2 is represented by $d_3$, the received signal strength at the receiver 3a when the receiver 3a received the signal from the transmitter 2 is represented by $RSSI_A$, and the received signal strength at the receiver 3b when the receiver 3b received the signal from the transmitter 2 is represented by $RSSI_B$, and the received signal strength at the receiver 3c when the receiver 3c received the signal from the transmitter 2 is represented by $RSSI_C$.

Then, each of the distances $d_1$ to $d_3$ can be obtained from the aforementioned expression (1). Here, n=2.

$$d_1=10^{\{(RSSI@1\ m-RSSI_A)/(10*2)\}} \tag{2}$$

$$d_2=10^{\{(RSSI@1\ m-RSSI_B)/(10*2)\}} \tag{3}$$

$$d_3=10^{\{(RSSI@1\ m-RSSI_C)/(10*2)\}} \tag{4}$$

Further, an equation formulated using $d_1$ to $d_3$ obtained from the aforementioned Expressions (2) to (4) and the distance between the receivers 3a to 3c and the transmitter 2 represented by the three-dimensional coordinate system turns out to be as follows:

$$\{(x_1-x_T)^2+(y_1-y_T)^2+(z_1-z_T)^2\}^{1/2}=d_1=10^{\{(RSSI@1\ m-RSSI_A)/(10*2)\}} \tag{5}$$

$$\{(x_2-x_T)^2+(y_2-y_T)^2+(z_2-z_T)^2\}^{1/2}=d_2=10^{\{(RSSI@1\ m-RSSI_B)/(10*2)\}} \tag{6}$$

$$\{(x_3-x_T)^2+(y_3-y_T)^2+(z_3-z_T)^2\}^{1/2}=d_3=10^{\{(RSSI@1\ m-RSSI_C)/(10*2)\}} \tag{7}$$

In the Expressions (5) to (7), the parameters other than $x_T$, $y_T$, $z_T$ are known. Therefore, the estimation unit 102 calculates the three-dimensional coordinates of the transmitter 2 by solving the ternary quadratic equation of the Expressions (5) to (7).

Next, the location information server 10 determines whether or not it is possible to perform location correction based on the received signal strength of the fourth highest (S104). The correction unit 103 of the location information computation unit 100 compares the received signal strengths of the first to the third highest with the received signal strength of the fourth highest in order to determine whether it is possible to perform location correction using the signal strength measurement information of the received signal strength of the fourth highest. All or the mean value of the received signal strengths of the first to the third highest may be compared with the received signal strength of the fourth highest. Alternatively, the received signal strength of the first highest or the received signal strength of the third highest may be compared with the received signal strength of the fourth highest.

When the difference between the received signal strength based on at least one of the received signal strengths of the first to the third highest and the received signal strength of the fourth highest is smaller than the predetermined value, it is determined, from the signal strength measurement information of the received signal strength of the fourth highest, that the location correction can be performed, and when the difference between the received signal strength based on at least one of the received signal strengths of the first to the third highest and the received signal strength of the fourth highest is greater than the predetermined value, it is determined, from the signal strength measurement information of the signal strength of the fourth highest, that the location correction cannot be performed.

For instance, the receiver at which the received signal strength is the first highest is referred to as the receiver 3a and the receiver at which the received signal strength is the fourth highest is referred to as the receiver 3d, and when the difference in the received signal strengths between the receiver 3a and the receiver 3d is smaller than −1.5 [dBm], it is determined, from the signal strength measurement information of the received signal strength at the receiver 3d, that the location correction can be performed, and when the difference between the received signal strength at the receiver 3a and the received signal strength at the receiver 3d is greater than −1.5 [dBm], it is determined, from the signal strength measurement information of the received signal strength at the receiver 3d, that the location correction cannot be performed. Note that this threshold value is merely an example and the value can be set arbitrarily according to the environment under which measurement is performed.

When it is determined, from the signal strength measurement information of the received signal strength of the fourth highest, that it is possible to perform location correction (S104/Yes), location correction processing (S105) is performed. Alternatively, when it is determined, from the signal strength measurement information of the received signal strength of the fourth highest, that it is not possible to perform location correction (S104/No), location correction processing is not performed (S106) and the processing ends with the estimated location determined in S103 being the final outcome of the estimation processing.

Figure 7:
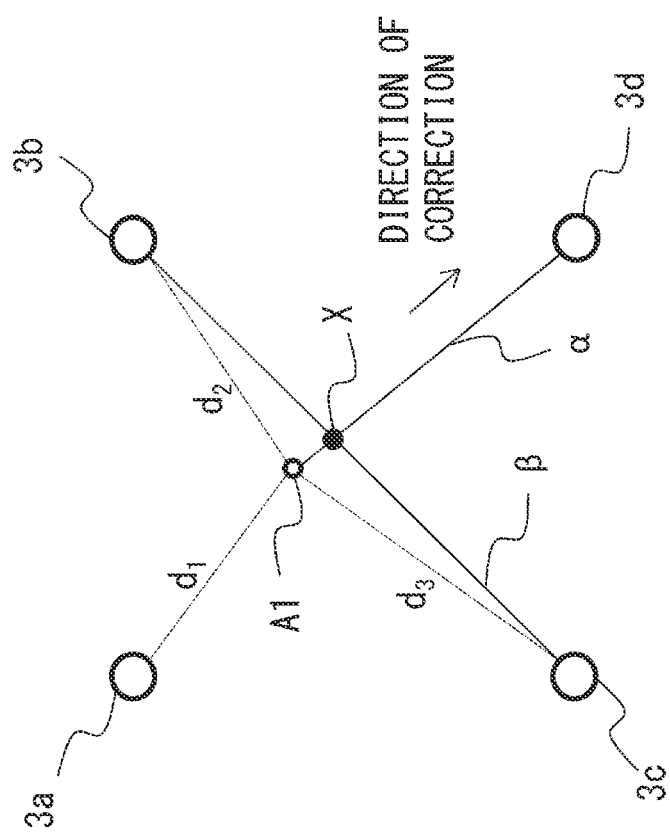
FIG. 7 is a diagram for describing the location correction method according to the first embodiment.

In the location correction processing, as shown in FIG. 6, the correction unit 103 identifies the direction of correction (S111) and sets the correction upper limit (S112). For instance, as shown in FIG. 7, based on the distance $d_1$ according to the signal strength measurement information of the receiver 3a, the distance $d_2$ according to the signal strength measurement information of the receiver 3b, and the distance $d_3$ according to the signal strength measurement information of the receiver 3c, the location estimated by the three-point positioning method is referred to as A1. In this case, the direction from the location A1 to the receiver 3d at which the received signal strength is the fourth highest is the direction of correction. The direction of correction is the direction along a line segment α (a correction line) connecting the three-dimensional coordinates of the location A1 and the three-dimensional coordinates of the receiver 3d. The location A1 is corrected in this direction of correction such that the location A1 is brought closer to the receiver 3d. Further, a line segment β connecting the receiver 3b and the receiver 3c is the correction upper limit X. The correction upper limit X is a point of intersection of the line segment β and the line segment α, the line segment β being a line connecting the three-dimensional coordinates of the receiver 3b and the three-dimensional coordinates of the receiver 3c and the line segment α being a line connecting the location A1 and the receiver 3d. It can also be said that the line segment β is a connection line that connects the receiver 3c and the receiver 3b that are at opposite positions across the line segment α.

Figure 8:
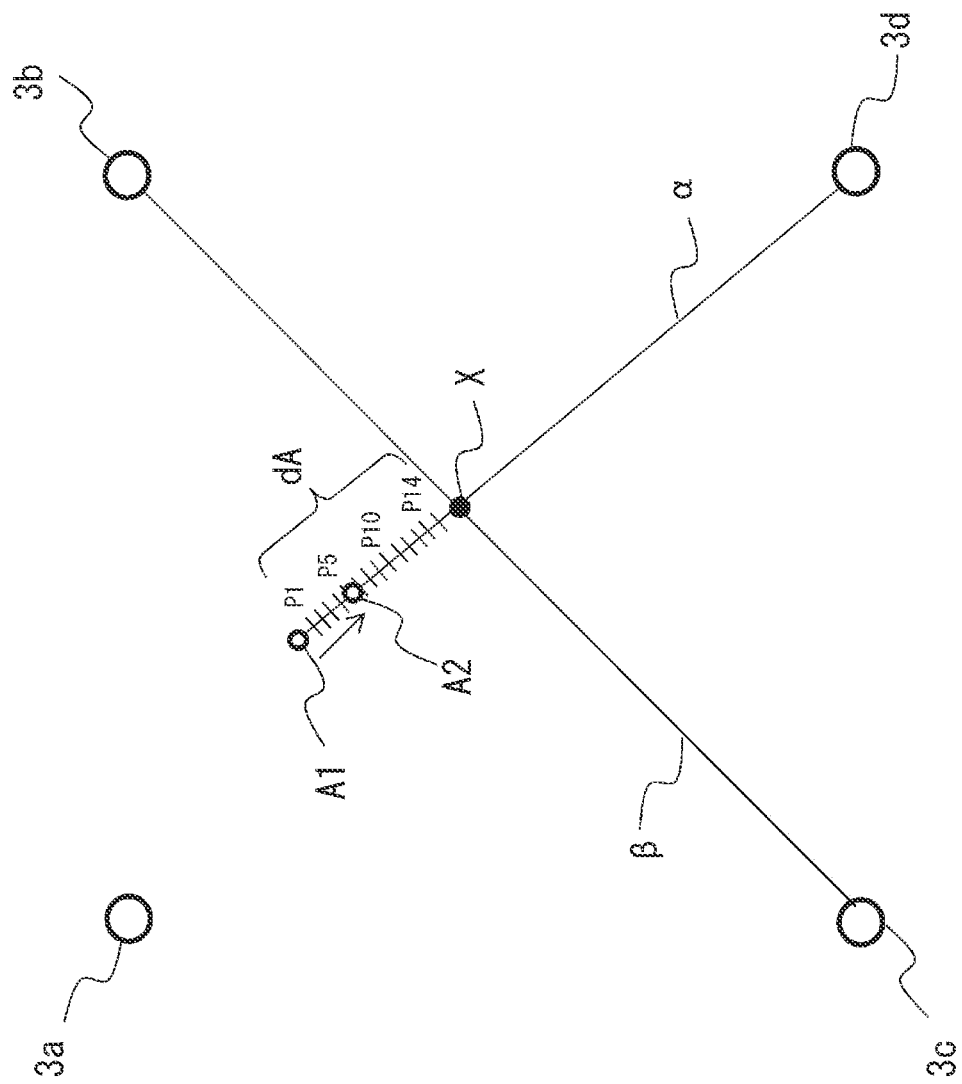
FIG. 8 is a diagram for describing the location correction method according to the first embodiment.

Next, the correction unit 103 corrects the estimated location based on the signal strength measurement information of the received signal strength of the fourth highest within the range of the direction of correction and the correction upper limit (S113). For instance, as shown in FIG. 8, the estimated location A1 on the line segment α to the correction upper limit X falls within a correction range dA, and within this correction range, the estimated location is corrected in accordance with the received signal strength at the receiver 3d.

For instance, a scale in which the correction range dA from the estimated location A1 to the correction upper limit X is divided into 15 is set, and the location is corrected on thus set scale. In this example, since the difference in the received signal strength between the receiver 3a and the receiver 3d is between the range of 0 to −1.5 [dBm], this range is divided into 15, and the corrected location is calculated at an interval of 0.1 [dBm] as shown in FIG. 9. Specifically, the direction of correction changes depending on the degree of strength of the received signal strength at the receiver 3a and the received signal strength at the receiver 3d, and therefore, the location A2 after the correction is calculated in accordance with the difference in the degree of the strength of the received signal strength at the receiver 3a and the received signal strength at the receiver 3d. It can be said that the estimated location A2 is corrected based on the difference between the received signal strength at the receiver 3a that is at a position opposite to the receiver 3d at which the received signal strength is the fourth highest across the estimated location A1 and the received signal strength at the receiver 3d.

For instance, in the example shown in FIG. 9, when the difference between the received signal strength at the receiver 3a and the received signal strength at the receiver 3d is −1.4, the location is corrected from A1 to P1, and when the difference between the received signal strength at the receiver 3a and the received signal strength at the receiver 3d is −0.1, the location is corrected from A1 to P14. When the difference between the received signal strength at the receiver 3a and the received signal strength at the receiver 3d is equal to or smaller than −1.5, the location after the correction is referred to as A1, that is, there is no correction of the location, and when the received signal strength at the receiver 3a and the received signal strength at the receiver 3d is equal to or greater than −0.1, the location after the correction is referred to as the correction upper limit X.

As described above, in this embodiment, by correcting the location estimated by the three-point measurement method, it is possible to perform detection of location with higher accuracy. In the related technique, merely estimating the location based on the received signal strength by the three-point positioning method involves an error in the distance based on the received signal strength depending on the receiving environment. On the other hand, in this embodiment, correction of the location of the transmitter estimated from the received signal strengths at the receivers installed in three locations is performed using the received signal strength at further another receiving point. By correcting the location obtained from the distance based on the received signal strength at three locations based on the received signal strength at another point, it is possible to calculate the location information with further accuracy.

For instance, in the positional relationship as that shown in FIG. 7, when the received signal strength at the receiver 3a is the strongest, it is likely to be estimated that the location of the target object is closer to the receiver 3a than its actual location. In this embodiment, by performing correction of the estimated location of the target object using the received signal strength at the receiver 3d, which is the next highest signal strength after the received signal strengths at the receivers 3a to 3c, it is possible to bring the estimated location of the object close to its actual location.

In this embodiment, an example of estimating the three-dimensional location of the transmitter 2 is described, however when it is known in advance that the transmitter 2 and the receivers 3 are on substantially the same plane and thus there is no need to estimate the three-dimensional location of the transmitter 2, a two-dimensional location thereof is estimated. For instance, when it is known that the transmitter and the receiver are on the same floor and at substantially the same height, there is no need to estimate the location in the height direction, and a two-dimensional location thereof is estimated.

Second Embodiment

Next, a second embodiment will be described. Note that for the sake of simplifying the description, an example of estimating the two-dimensional location of the receiver 2 will be described in this embodiment. In this embodiment, in the same configuration as that according to the first embodiment, an estimated circle indicating a distance estimated from the received signal strength is used when performing location estimation by the three-point positioning method.

Figure 10:
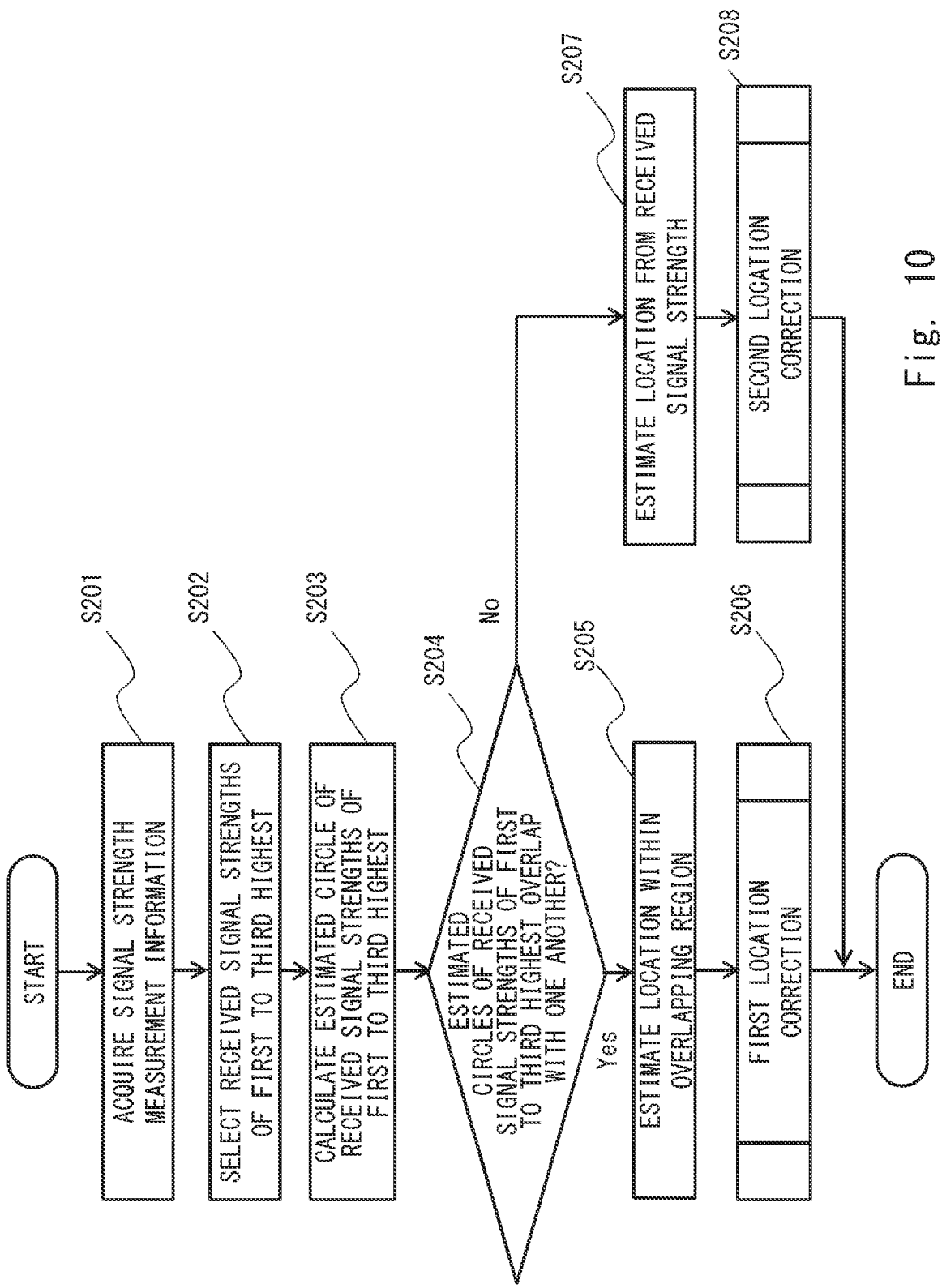
FIG. 10 is a flowchart showing an example of a location estimation method according to a second embodiment.
Figure 11:
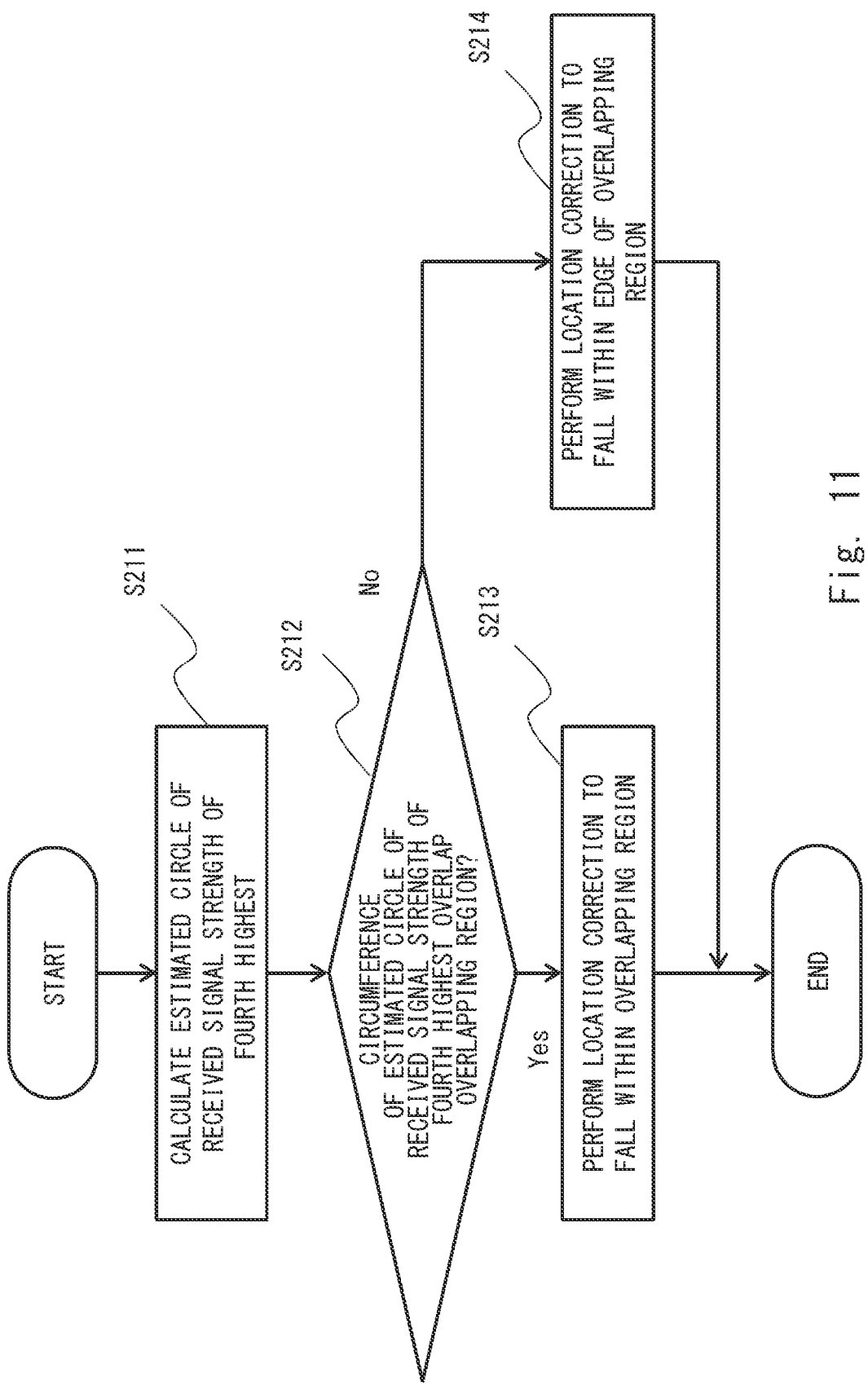
FIG. 11 is a flowchart showing an example of a location correction method according to the second embodiment.
Figure 12:
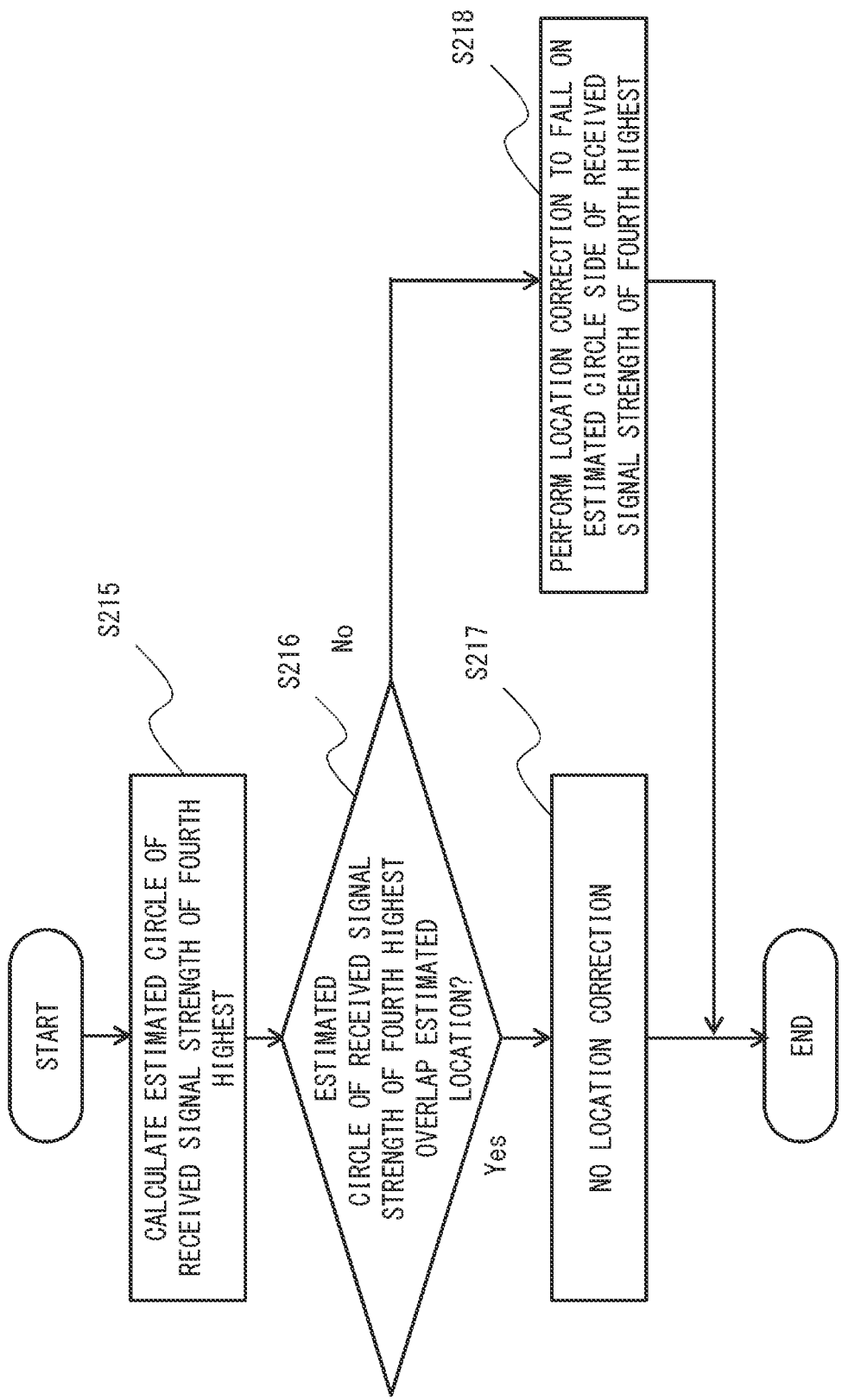
FIG. 12 is a flowchart showing an example of the location correction method according to the second embodiment.

FIG. 10 shows a flow of a location estimation method according to this embodiment. FIG. 11 shows a flow of first location correction processing (S206) performed in the method of FIG. 10. FIG. 12 shows a flow of second location correction processing (S208) performed in the method of FIG. 10.

As shown in FIG. 10, first, as in Steps S101 and S102 according to the first embodiment, the location information server 10 acquires the signal strength measurement information from the plurality of the receivers 3 (S201) and selects the signal strength measurement information of the receivers 3 at which the received signal strengths are the first to the third highest (S202).

Next, the location information server 10 calculates the estimated circle using the signal strength measurement information of the receivers 3 at which the received signal strengths are the first to the third highest (S203). The estimation unit 102 of the location information computation unit 100 calculates the estimated circle of each receiver 3 based on the signal strength measurement information of the receivers 3 at which the received signal strengths are the first to the third highest. The estimated circle is a circle centered at the location of the receiver 3 and having a radius that is a distance obtained from the received signal strength at the receiver 3.

Figure 13:
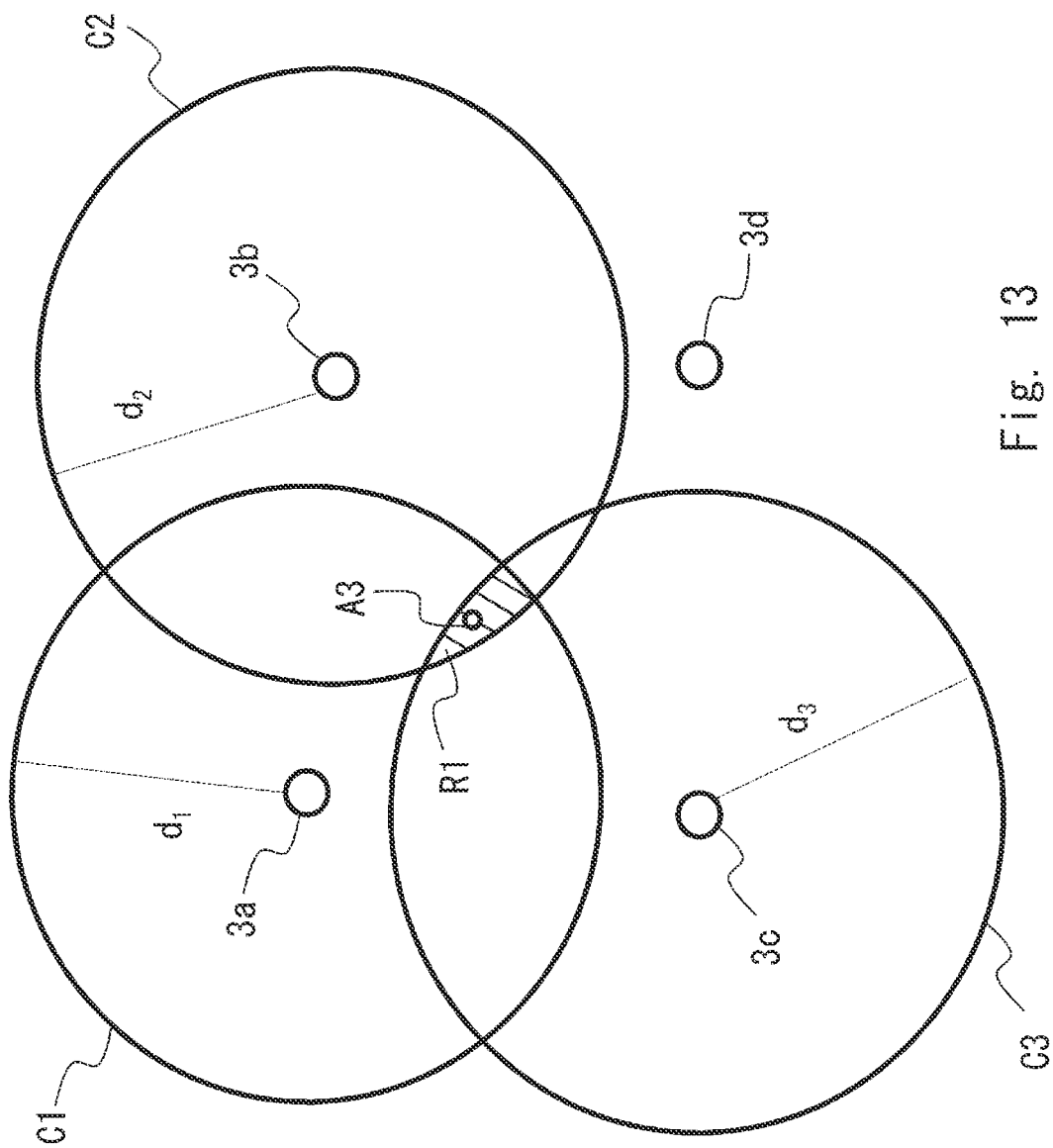
FIG. 13 is a diagram for describing the location estimation method according to the second embodiment.

For instance, as shown in FIG. 13, when the received signal strengths at the receivers 3a to 3c are used, an estimated circle C1 centered on the location of the receiver 3a and having a radius of the distance $d_1$ based on the received signal strength, an estimated circle C2 centered on the location of the receiver 3b and having a radius of the distance $d_2$ based on the received signal strength, and an estimated circle C3 centered on the location of the receiver 3c and having a radius of the distance $d_3$ based on the received signal strength are obtained. The distances $d_1$ to $d_3$ are obtained based on the received signal strengths at the respective receivers 3 as in the first embodiment.

Next, the location information server 10 determines whether the three estimated circles that are calculated overlap with one another (S204). In order to determine where it is possible to perform location estimation based on the three estimated circles, the estimation unit 102 of the location information computation unit 100 determines whether there is an overlapping region where all of the estimated circles obtained based on the received signal strengths of the first to the third highest overlap with one another.

When the three estimated circles overlap with one another (S204/Yes), the location information server 10 estimates the location of the transmitter within the overlapping region of the circles (S205). When, as shown in FIG. 13, for instance, the estimated circle C1 of the receiver 3a, the estimated circle C2 of the receiver 3b, and the estimated circle C3 of the receiver 3c are present within the overlapping region R1, the estimation unit 102 of the location information computation unit 100 estimates the location A3 of the transmitter 2 within the overlapping region R1. For example, the center (the center of gravity) of the overlapping region R1 is set as the estimated location A3. In this embodiment, in the overlapping region R1, further correction of location is performed based on the received signal strength of the fourth highest.

Next, the location information server 10 performs the first location correction processing on the location estimated within the overlapping region (S206). In the first location correction processing, as shown in FIG. 11, the estimated circle based on the received signal strength of the fourth highest is calculated (S211). As in the aforementioned Step S203, the estimation unit 102 of the location information computation unit 100 calculates the estimated circle of the receiver 3 at which the received signal strength is the fourth highest based on the fourth highest received signal strength. Note that difference between the received signal strength of the fourth highest and the received signal strengths of the first to the third highest is small, as in the first embodiment.

Next, the location information server 10 determines whether the circumference of the calculated estimated circle of the receiver at which the received signal strength is the fourth highest overlaps the overlapping region (S212). In order to determine the location correction method in accordance with the estimated circle of the receiver at which the received signal strength is the fourth highest, the estimation unit 102 of the location information computation unit 100 determines whether the circumference of the estimated circle obtained from the received signal strength of the fourth highest overlaps the overlapping region obtained based on the received signal strengths of the first to the third highest.

Figure 14:
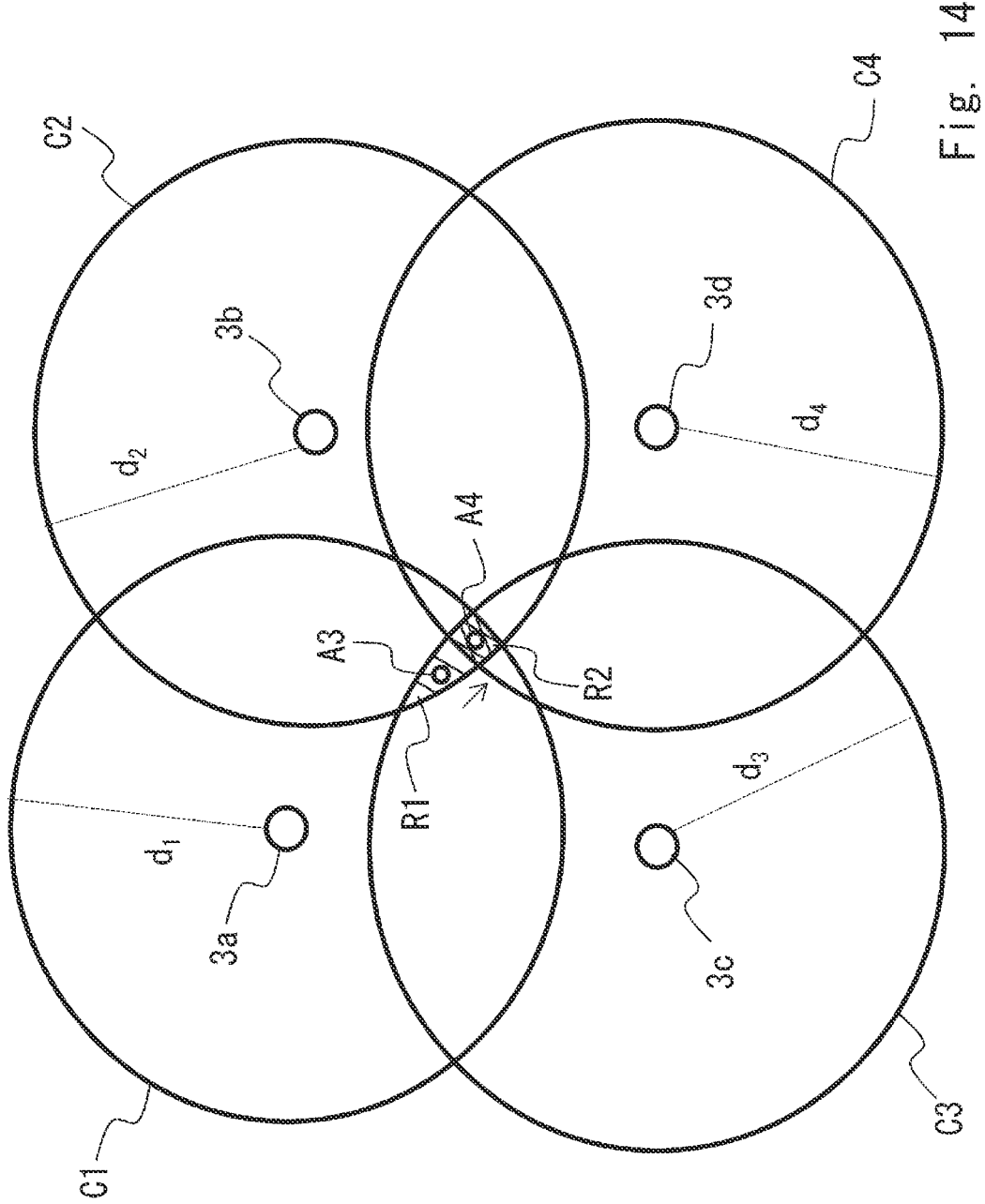
FIG. 14 is a diagram for describing the location correction method according to the second embodiment.

When the circumference of the estimated circle of the receiver at which the received signal strength is the fourth highest overlaps the overlapping region of the estimated circles of the receivers at which the received signal strengths are the first to the third highest (S212/Yes), the location information server 10 performs location correction so that the circumference of the calculated estimated circle falls within the overlapping region which the estimated circle of the receiver at which the received strength is the fourth highest overlaps (S213). When, for instance, the estimated circle C1 of the receiver 3a, the estimated circle C2 of the receiver 3b, and the estimated circle C3 of the receiver 3c overlap with one another in the overlapping region R1, and further, the circumference of the estimated circle C4 of the receiver 3d overlaps the overlapping region R1 as shown in FIG. 14, that is, when there is an overlapping region R2 where all of the estimated circles C1 to C4 overlap with one another, the estimation unit 102 of the location information computation unit 100 corrects the estimated location A3 in the overlapping region R1 to the location A4 in the overlapping region R2. The overlapping region R2 is a region in the estimated circle C4 of the receiver at which the received signal strength is the fourth highest in the overlapping region R1. For instance, the location of the transmitter is corrected so that it is brought from the estimated location A3 to the center of the overlapping region R2.

Figure 15:
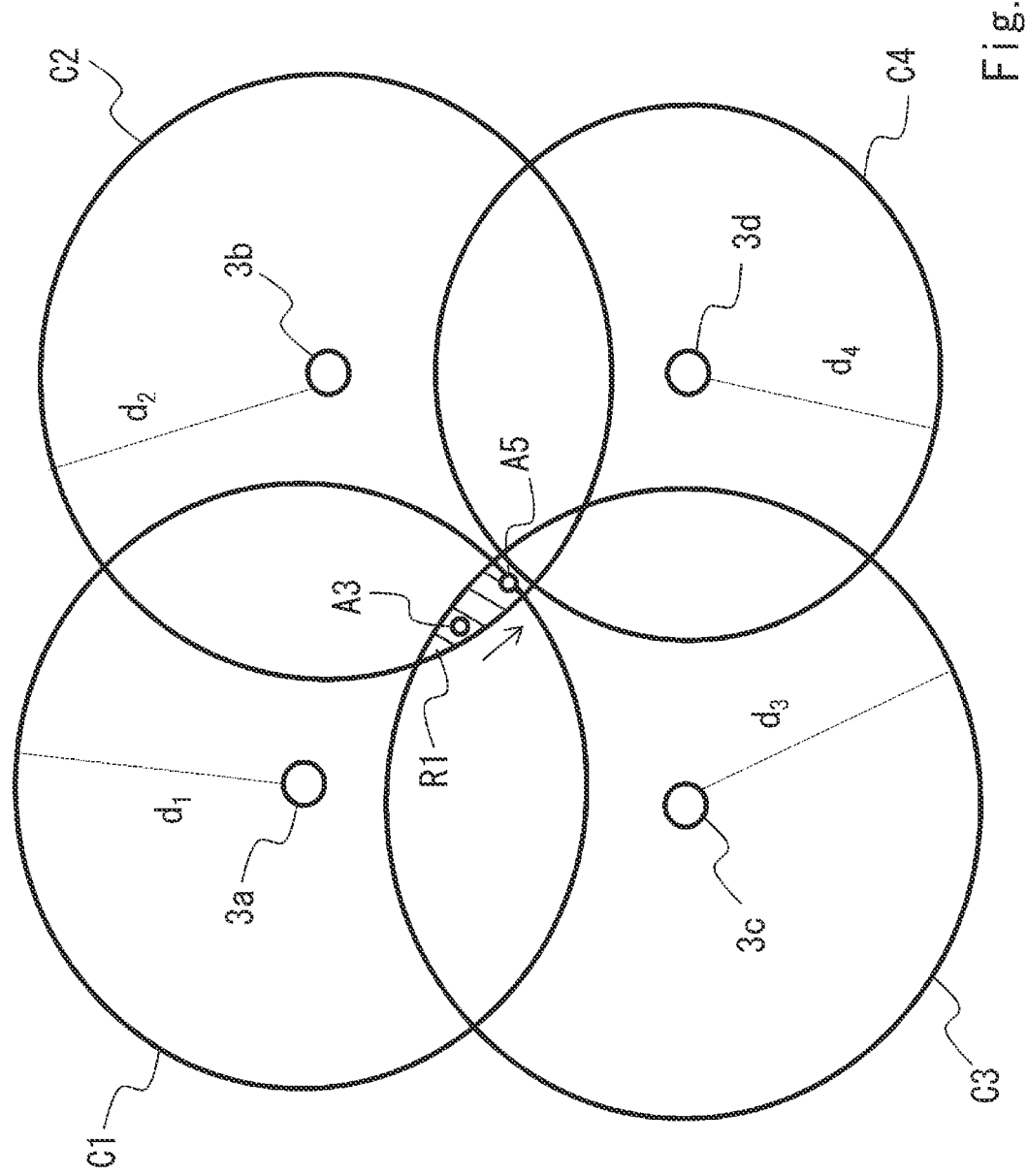
FIG. 15 is a diagram for describing the location correction method according to the second embodiment.

Further, when the circumference of the estimated circle of the receiver at which the received signal strength is the fourth highest does not overlap the overlapping region of the estimated circles of the receivers at which the received signal strengths are the first to the third highest (S212/No), the location information server 10 corrects the location of the transmitter so that it is brought to the edge of the overlapping region of the estimated circles of the receivers at which the received signal strengths are the first to the third highest (S214). In this case, the estimation unit 102 of the location information computation unit 100 corrects the location of the transmitter so that it is brought closer to the circumference of the estimated circle of the receiver at which the received signal strength is the fourth highest one within the overlapping region. For instance, as shown in FIG. 15, when the circumference of the estimated circle C4 of the receiver 3d is closer to the receiver 3d side than to the overlapping region R1 of the estimated circle C1 of the receiver 3a, the estimated circle C2 of the receiver 3b, and the estimated circle C3 of the receiver 3c, the location of the transmitter is corrected so that it is brought to the location A5 that is the closest to the receiver 3d within the overlapping region R1.

Figure 16:
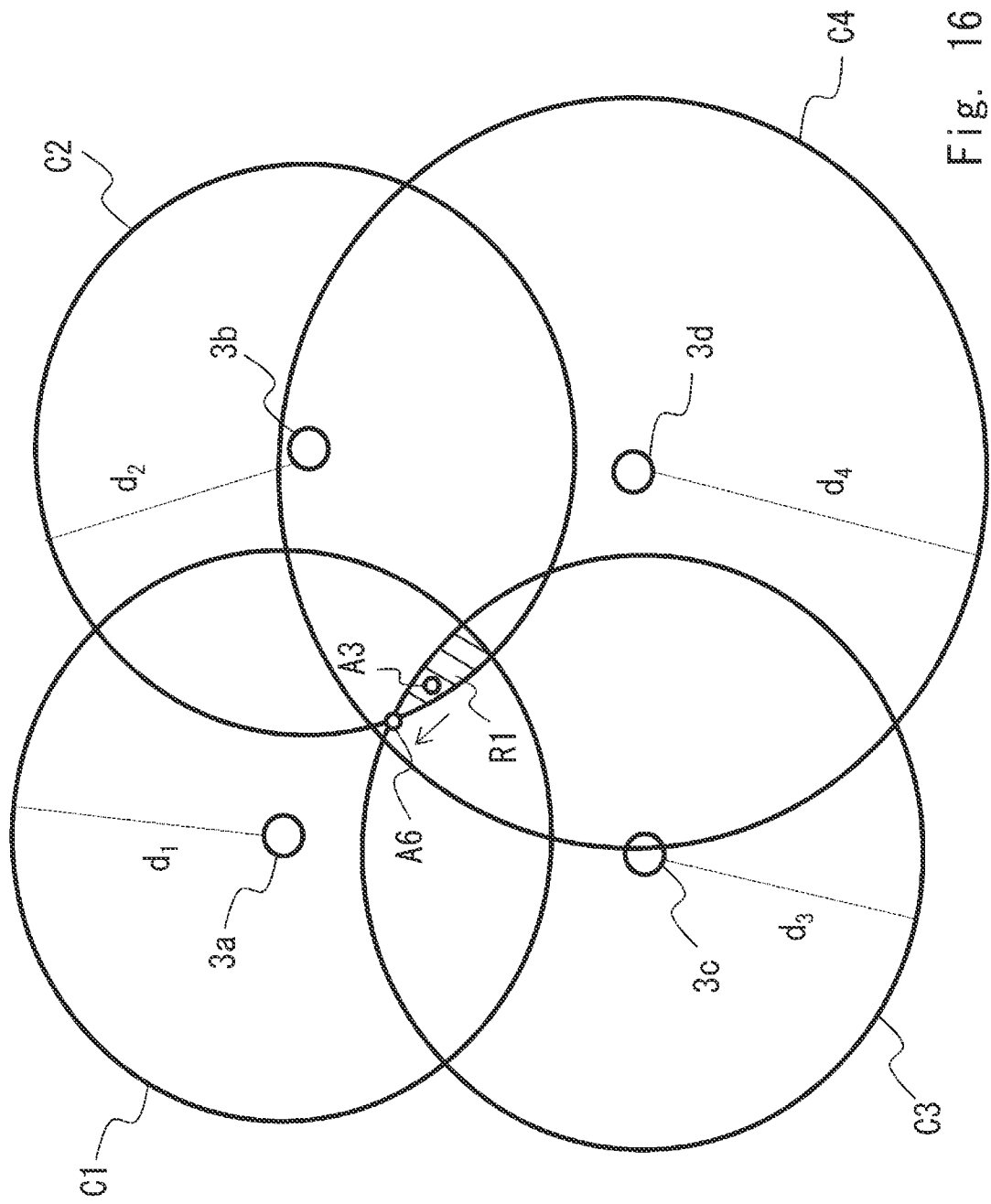
FIG. 16 is a diagram for describing the location correction method according to the second embodiment.

Further, as shown in FIG. 16, when the circumference of the estimated circle C4 of the receiver 3d is closer to the side opposite to the receiver 3d, that is, on the receiver 3a side than to the overlapping region side R1 of the estimated circle C1 of the receiver 3a, the estimated circle C2 of the receiver 3b, and the estimated circle C3 of the receiver 3c, the location of the transmitter is corrected so that it is brought to a location that is farthest from the receiver 3d within the overlapping region R1, that is, to the location A6 that is the closest to the receiver 3a within the overlapping region R1.

Figure 17:
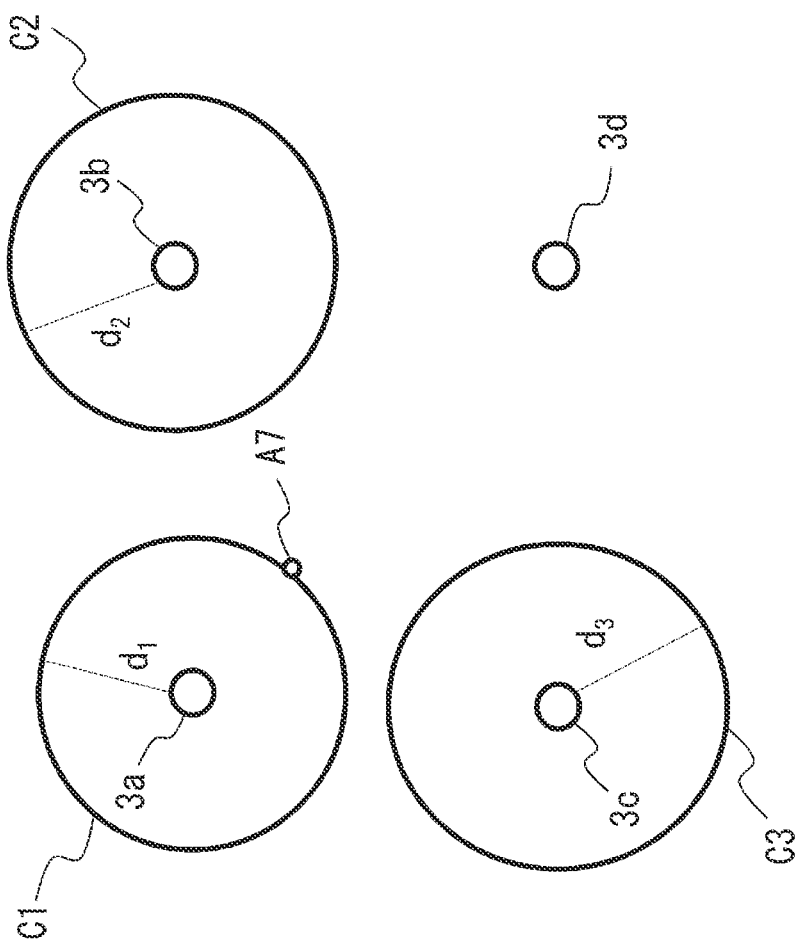
FIG. 17 is a diagram for describing the location estimation method according to the second embodiment.

On the other hand, in FIG. 10, when the three estimated circles do not overlap with one another (S204/No), the location information server 10 estimates the location of the transmitter from the received signal strength (S207). When, for instance, the estimated circle C1 of the receiver 3a, the estimated circle C2 of the receiver 3b and the estimated circle C3 of the receiver 3c are distant from one another and do not overlap with one another as shown in FIG. 17, the estimation unit 102 of the location information computation unit 100 estimates the location of the transmitter based on each received signal strength. That is, as in the first embodiment, the three-dimensional location A7 estimated from the distance $d_1$ according to the received signal strength at the receiver 3a, the distance $d_2$ according to the received signal strength at the receiver 3b, and the distance $d_3$ according to the received signal strength at the receiver 3c are obtained.

Next, the location information server 10 performs second location correction processing on the location estimated from the received signal strength (S208). In the second location correction processing, as shown in FIG. 12, the estimated circle according to the received signal strength of the fourth highest is calculated (S215). Like in the aforementioned steps S203 and S211, the estimation unit 102 of the location information calculation unit 100 calculates the estimated circle of the receiver 3 at which the received signal strength is the fourth highest based on the received signal strength of the fourth highest. Note that as in step S211, the difference between the received signal strength of the fourth highest and the received signal strengths of the first to the third highest is small.

Next, the location information server 10 determines whether or not the calculated estimated circle of the receiver at which the received signal strength is the fourth highest overlaps the estimated location (S216). The estimation unit 102 of the location information computation unit 100 determines whether the estimated circle of receiver at which the received signal strength is the fourth highest overlaps the estimated location obtained from the received signal strengths of the first to the third highest in order to determine whether it is possible to perform location correction based on the estimated circle of the receiver at which the received signal strength is the fourth highest.

Figure 18:
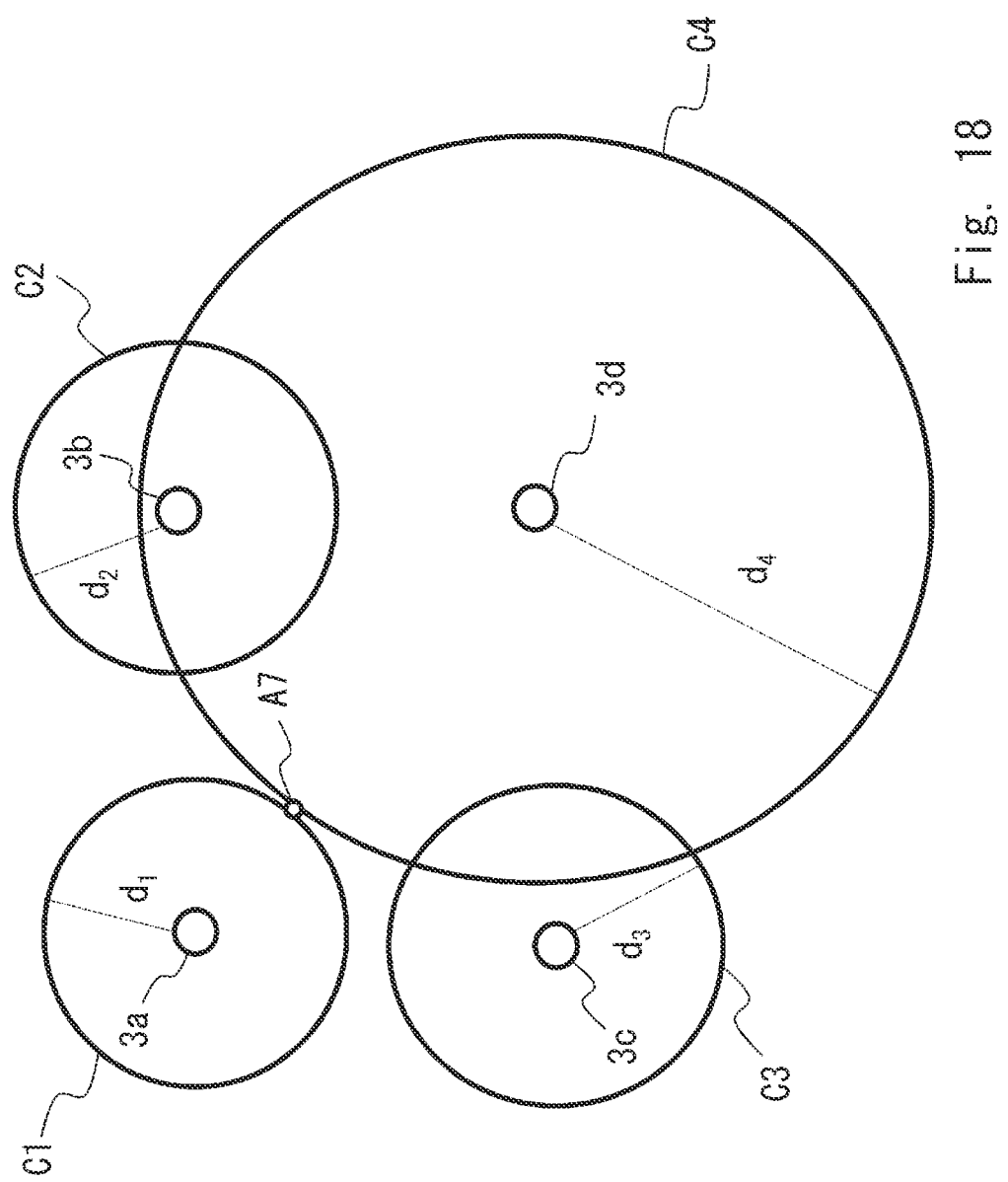
FIG. 18 is a diagram for describing the location correction method according to the second embodiment.

When the estimated circle of the receiver at which the received signal strength is the fourth highest overlaps the estimated location (S216/Yes), the location information server 10 determines that there is no correction to be made (S217). As shown in FIG. 18, the location A7 is estimated from the distance $d_1$ according to the received signal strength at the receiver 3a, the distance $d_2$ according to the received signal strength at the receiver 3b, and the distance $d_3$ according to the received signal strength at the receiver 3c, and when the estimated circle C4 having the distance $d_4$ according to the received signal strength at the receiver 3d overlaps the estimated location A7, correction of location is not performed. That is, when the estimated distance $d_4$ based on the received signal strength at the receiver 3d is close to the estimated location A7 or is more distant from the receiver 3d than from the estimated location A7, it is determined that the estimated location estimated from the received signal strengths at the receivers 3a to 3c is trustworthy and the estimated location A7 estimated from the received signal strengths at the receivers 3a to 3c is made the final outcome of the estimation processing.

Figure 19:
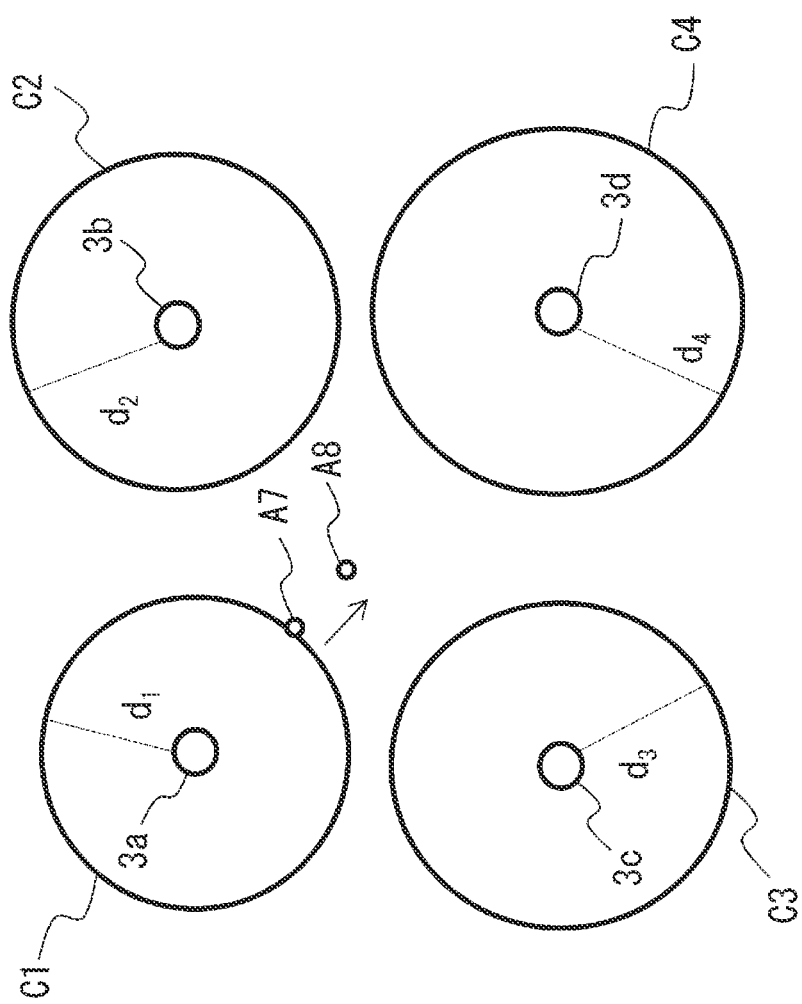
FIG. 19 is a diagram for describing the location correction method according to the second embodiment.

Further, when the estimated circle of the receiver at which the received signal strength is the fourth highest does not overlap the estimated location (S216/No), the location information server 10 corrects the estimated location so that it falls within the estimated circle side of the receiver at which the received signal strength is the fourth highest (S218). In this case, the estimation unit 102 of the location information computation unit 100 corrects the location of the transmitter so that it is brought closer to the estimated circle of the receiver at which the received signal strength is the fourth highest. For instance, as shown in FIG. 19, the location A7 is estimated from the distance $d_1$ according to the received signal strength at the receiver 3a, the distance $d_2$ according to the received signal strength at the receiver 3b, and the distance $d_3$ according to the received signal strength at the receiver 3c, and when the estimated circle C4 having the distance $d_4$ according to the received signal strength at the receiver 3d is closer to the receiver 3d than to the estimated location A7, the estimated location A7 estimated based on the received signal strengths at the receivers 3a to 3c is corrected to the location A8 that is on the side closer to the receiver 3d and the corrected location is made the final outcome of the estimation processing. This correction is performed, like in the first embodiment, based on the difference between the received signal strength at the receiver 3a and the received signal strength at the receiver 3d.

As described above, in the present embodiment, estimation of location and correction of the location are performed in the configuration that is the same as that of the first embodiment using the estimated circle indicating the distance estimated from the received signal strength. In this case, like in the first embodiment, the location estimated from the received signal strengths at the three receivers is further corrected based on the received signal strength at another receiver whereby the highly accurate location estimation can be performed.

In this embodiment, estimation of the two-dimensional location of the transmitter 2 has been described as an example, however, the same procedure is performed for the estimation of the three-dimensional location of the transmitter 2. When estimating the three-dimensional location of the transmitter 2, an estimated spherical surface estimated from the received signal strength at each receiver 3 may be used instead of using the estimated circle estimated based on the received signal strength at each receiver 3.

Note that the present disclosure is not limited to the aforementioned embodiments and can be modified as appropriated without departing from the gist of the present disclosure.

Each configuration of the aforementioned embodiments may be constituted of hardware or software or a combination of both, and may be constituted of one hardware or one software or a plurality of hardware components or a plurality of software components. The functions (processing) of each apparatus may be implemented by a computer with a CPU, a memory, etc. For instance, a program for performing a location estimation method according to the embodiment is stored in a storage apparatus and each function can be implemented by causing the CPU to execute the program stored in the storage apparatus.

The above programs can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Compact Disc-Read Only Memory), CD-R, CD-R/W, and semiconductor memories (such as Mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

According to the embodiments of the present disclosure, it is possible to provide a location estimation apparatus, a location estimation method, and a program for location estimation, which can improve the accuracy of location estimation.

The present disclosure can be suitably applied to the location estimation apparatus that estimates locations of electronic devices.

What is claimed is:

1. A location estimation apparatus comprising:
   an acquisition unit configured to acquire, from each of a plurality of receivers, a received signal strength of a radio signal sent out from a transmitter;
   an estimation unit configured to estimate a location of the transmitter based on the received signal strengths of first to third highest among the acquired received signal strengths; and
   a correction unit configured to correct, when a difference between a received signal strength based on the received signal strength of at least one of the first to the third highest and a received signal strength of fourth highest is smaller than a predetermined value, the estimated location of the transmitter based on the received signal strength of the fourth highest.

2. The location estimation apparatus according to claim 1, wherein the correction unit is configured to correct the estimated location of the transmitter in a direction along a correction line connecting the estimated location of the transmitter and a location of the receiver that has acquired the received signal strength of the fourth highest.

3. The location estimation apparatus according to claim 2, wherein the correction unit is configured to correct the estimated location of the transmitter with an intersection of a connection line and the correction line being set as an upper limit for the correction, the connection line being a line that connects two receivers that are disposed at opposite positions across the correction line among the receivers which have acquired the received signal strengths of the first to the third highest.

4. The location estimation apparatus according to claim 1, wherein the correction unit is configured to correct the estimated location of the transmitter based on the difference between the received signal strength at the receiver disposed at a position opposing the receiver which has acquired the received signal strength of the fourth highest via the estimated location of the transmitter among the receivers that have acquired the received signal strengths of the first to the third highest and the received signal strength of the fourth highest.

5. The location estimation apparatus according to claim 1, wherein regarding each of the received signal strengths of the first to the third highest, the estimation unit is configured to estimate, when first to third estimated circles each centered at the location of the receiver that has acquired the respective received signal strengths and having a radius that is a distance estimated based on the respective received signal strengths overlap with one another, a three-dimensional location of the transmitter within an overlapping region of the first to the third estimated circles, and
   the correction unit is configured to correct the estimated location of the transmitter within the overlapping region based on the received signal strength of the fourth highest.

6. The location estimation apparatus according to claim 5, wherein the correction unit is configured to correct, when a circumference of a fourth estimated circle centered at the location of the receiver that has acquired the received signal strength of the fourth highest and having a radius that is a distance estimated based on the received signal strength of the fourth highest overlap the overlapping region, the estimated location of the transmitter within the fourth estimated circle in the overlapping region.

7. The location estimation apparatus according to claim 5, wherein the correction unit is configured to correct, when a circumference of the fourth estimated circle centered at the location of the receiver that has acquired the received signal strength of the fourth highest and having a radius that is a distance estimated based on the received signal strength of the fourth highest and the overlapping region do not overlap with one another, the estimated location of the transmitter so that the estimated location of the transmitter is brought closer to the circumference of the fourth estimated circle within the overlapping region.

8. The location estimation apparatus according to claim 1, wherein
   regarding each of the received signal strengths of the first to the third highest, the estimation unit is configured to estimate, when first to third estimated circles each centered at the location of the receiver that has acquired the respective received signal strengths and having a radius that is a distance estimated based on the respective received signal strengths do not overlap with one another, the location of the transmitter based on the received signal strengths of the first to the third highest, and
   the correction unit is configured to correct, when a circumference of a fourth estimated circle centered at the location of the receiver that has acquired the received signal strength of the fourth highest and having a radius that is a distance estimated based on the received signal strength of the fourth highest and the estimated location of transmitter do not overlap with one another, the estimated location of the transmitter so that the estimated location of the transmitter is brought closer to the fourth estimated circle.

9. A location estimation method comprising:
   acquiring, from each of a plurality of receivers, a received signal strength of a radio signal sent out from a transmitter;
   estimating a location of the transmitter based on the received signal strengths of first to third highest among the acquired received signal strengths; and
   correcting, when a difference between a received signal strength based on at least one of the received signal strengths of the first to the third highest and a received signal strength of fourth highest is smaller than a predetermined value, the estimated location of the transmitter based on the received signal strength of the fourth highest.

10. A non-transitory computer readable medium storing a program for location estimation for causing a computer to execute processing of:

acquiring, from each of a plurality of receivers, a received signal strength of a radio signal sent out from a transmitter;

estimating a location of the transmitter based on the received signal strengths of first to third highest among the acquired received signal strengths; and correcting, when a difference between a received signal strength of at least one of the first to the third highest and a received signal strength of fourth highest is smaller than a predetermined value, the estimated location of the transmitter based on the received signal strength of the fourth highest.

* * * * *